United States Patent [19]

Bryant

[11] Patent Number: 4,591,073
[45] Date of Patent: May 27, 1986

[54] APPARATUS FOR MONITORING PARTICULATE MATERIAL

[75] Inventor: Robert G. W. Bryant, Totton, England

[73] Assignee: British-American Tobacco Company Limited, London, England

[21] Appl. No.: 663,886

[22] Filed: Dec. 7, 1984

Related U.S. Application Data

[63] Continuation of Ser. No. 351,596, Feb. 23, 1982, abandoned.

[30] Foreign Application Priority Data

Mar. 3, 1981 [GB] United Kingdom ................. 8106653

[51] Int. Cl.⁴ .......................... B67D 5/08; B65G 43/00
[52] U.S. Cl. ................................... 222/55; 198/502.1; 131/84.4; 19/240
[58] Field of Search ................... 222/55, 415; 198/502, 198/572, 573; 131/84 C; 33/129, 141 B; 19/239–240; 340/612, 617

[56] References Cited

U.S. PATENT DOCUMENTS

| | | | |
|---|---|---|---|
| 1,399,478 | 12/1921 | Hardt | 33/141 B |
| 2,920,355 | 1/1960 | Clark | 222/55 |
| 2,963,907 | 12/1960 | Sylvest | 222/55 X |
| 3,185,346 | 5/1965 | Lovell, Jr. et al. | 222/55 |
| 3,709,406 | 1/1973 | Binder et al. | 222/55 |
| 3,825,152 | 7/1974 | Davis et al. | 19/240 X |

Primary Examiner—Joseph J. Rolla
Assistant Examiner—Michael S. Huppert
Attorney, Agent, or Firm—Kane, Dalsimer, Kane, Sullivan and Kurucz

[57] ABSTRACT

Apparatus for monitoring the amount of tobacco particles being conveyed in a stream thereof, is disclosed. The apparatus comprises a freely rotatable roller with surface ribs extending across the conveyor. The roller is supported by a counter balance arm fastened upon a pivot and concentric with a transducer responsive to angular rocking motion of the pivot due to changes in the depth of the stream. Movement of the roller towards the conveyor is limited by an adjustable stop, engageable by the arm. A detector senses movement of the roller movement and generates a signal indicative of the amount of tobacco being conveyed. The feed rate of the tobacco may be adjusted in response to the signal from the detector.

1 Claim, 1 Drawing Figure

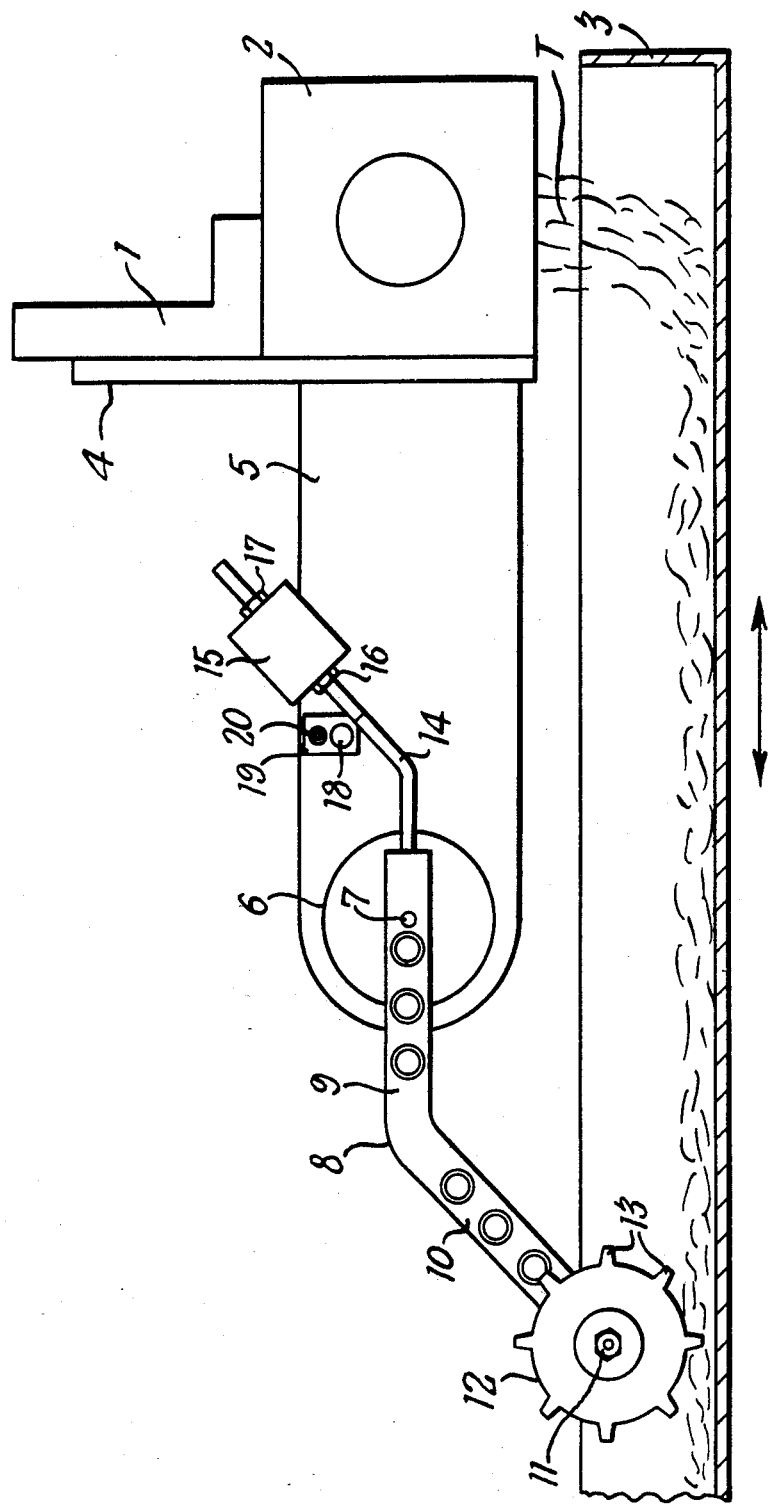

APPARATUS FOR MONITORING PARTICULATE MATERIAL

This is a continuation of application Ser. No. 351,596, filed Feb. 23, 1982, now abandoned.

BACKGROUND OF THE INVENTION

1. Field of the Invention

This invention relates to the monitoring of the amount of particulate material, cut tobacco for example, conveyed in a stream thereof. By "monitoring", we mean measuring and/or detecting changes in the amount of material in the stream.

2. Brief Description of the Prior Art

According to the presently conventional mode of making cigarette rod, cut tobacco is fed from a hopper to a conveyor, an endless-band conveyor for example, which conveys it to a garniture in which the tobacco is enwrapped in a continuous web of cigarette paper. Just upstream of the entry end of the garniture, the tobacco encounters a trimmer which serves to remove surplus amounts of tobacco, thus ensuring that the correct amount of tobacco is fed to the garniture. The trimmer may comprise a pair of driven discs, sometimes termed ecreteurs, and a rotary brush for removing the surplus tobacco trimmed off by the discs. It is usual to return the surplus tobacco, known as returns or ecretage, to the hopper.

If the cut tobacco is fed from the hopper to the conveyor at an unduly high rate, the returns per unit time represent a relatively high percentage of the hopper feed per unit time to the conveyor. Experience has shown that as the percentage value of the returns increases, the degree of degradation of the tobacco rises. If, on the other hand, the hopper feed rate is too low, there is a danger that short term variations in the amount of tobacco on the conveyor may make it impossible for the rod weight per unit length to be maintained at a value above a specified minimum value.

Clearly, it is desirable to maintain the percentage returns within present limits about the nominal value. Typically this value is 25%, although other values may be appropriate depending upon the tobacco characteristics and the rod specification.

In United Kingdom Patent Specification No. 958,205, there is disclosed the principle of monitoring the amount of the returns from the trimmer at a location in the path of the returns back to the hopper and, in accordance with signals derived from the monitoring means, varying the speed of a motor driving the hopper feed mechanism. A monitoring means disclosed in the specification comprises a detector flap pivotally mounted a little distance above the surface of a stream of tobacco conveyed in a reciprocating conveyor. The flap rests lightly on the tobacco stream, the downward pressure thereof being adjustable by variation in the position of a counter-weight relative to the pivot point of the flap.

Our experiments have shown that when a detector flap is employed for the purpose of monitoring the amount of tobacco conveyed in a stream, tobacco builds up against the flap at a location upstream of the zone of contact of the flap. This results in inaccurate determination of the amount of, or changes in the amount of, the tobacco being conveyed in the stream. With a view to rectifying this condition, a flap was replaced by a light, freely rotatable, plain roller as the contacting means. It was found that the use of the roller also had the demerit that tobacco built up on the upstream side thereof. Furthermore, there was a tendency for the roller to be thrown violently upwards when it encountered lumps of tobacco at the surface of the stream thereof. Even when a damping device was employed in an attempt to overcome this tendency, the roller did not accurately follow the surface undulations of the tobacco stream and/or caused tobacco build up or blockage.

SUMMARY OF THE INVENTION

It is an object of the present invention to provide apparatus by which the accuracy of monitoring of the amount of tobacco in a stream by direct physical contact with the surface of the stream is enhanced.

The invention provides apparatus for monitoring the amount of particulate material, cut tobacco for example, conveyed in a stream thereof, comprising rotary material-contacting means, means for mounting said contacting means so that it extends across the stream of material in contact with the surface thereof and is free to rise and fall in accordance with changes in the depth of the stream, and means operable to detect movement of said contacting means caused by such changes, said contacting means comprising projections whereby the movement of the stream causes the contacting means to rotate.

BRIEF DESCRIPTION OF THE DRAWING

In order that the invention may be understood and carried into effect, reference will now be made, by way of example, to the accompanying diagrammatic drawing which is a side elevation of parts of the path of returns in a cigarette-making machine, and a monitoring apparatus associated with the path.

DETAILED DESCRIPTION OF THE INVENTION

In the drawing, a fixed beam member 1 extends transversely of the cigarette-making machine, a Molins Mk. 9N maker for example. Attached at the underside of the member 1 is a screw conveyor 2 which serves to convey surplus cut tobacco from the ecreteurs (not shown) to a horizontal reciprocating conveyor 3 of shallow elongated trough form, leading to the hopper (not shown) of the machine. Tobacco delivered from the outlet of the conveyor 2 is indicated at 'T'. Attached to the member 1 and to a side face of the casing of the conveyor 2 is a plate 4 which is integral with a plate 5 extending above a side wall of the conveyor 3.

Mounted on the plate 5 is a transducer 6 which has a generally cylindrical exterior form. Extending concentrically within the transducer 6 and projecting therefrom is a rotatable spindle 7. Fixed on the protruding portion of the spindle 7 there is a light arm 8 of aluminium comprising a first portion 9 which, in the position shown, extends horizontally and a second portion 10 which extends downwardly at an angle of about 45°. At the lower end of the portion 10, there is mounted a horizontal spindle 11 on which a roller 12 is freely rotatably mounted by way of sealed ball bearings (not shown). The roller 12, constituting a rotary material-contacting means, is formed of Tufnol (Trade Mark). Integrally formed about its peripheral surface, the roller 12 has eight equally spaced ribs 13 which extend over substantially its whole width. The diameter of the roller is 4 cm and its width about 10 cm, only slightly less than the inside transverse dimension of the conveyor 3. The height of the ribs 13 is 0.5 cm.

Extending from the right-hand end of the arm portion 9 is a rod 14 of whose length a major portion extends upwardly at an angle of approximately 45°. Screwed on the upwardly extending portion of the rod 14 is a brass counterweight 15, whose adjustable position on the rod 14 can be secured by nuts 16, 17. To prevent the roller 12 from bottoming on the trough base of the conveyor 3, there is mounted on the plate 5 a stop pin 18 secured to a swivel plate 19 whose angular position is adjustable by means of a socket-headed screw 20.

The transducer 6 is of a type operable to generate and transmit a continuous signal indicative of the angle through which the spindle 7 has been turned from a reference angular position. This position may, for example, correspond to that position of the arm 8 in which the portion 9 extends horizontally. If, starting from this position of the arm 8, the roller 12 is caused to rise or fall in accordance with variations in the height of the tobacco stream in the conveyor 3, a signal will be transmitted, from the transducer 6, proportional to the amount by which the roller 12 has risen or fallen and, therefore, to changes in the depth of the stream.

Because of the ribs 13 on the roller 12, there is no scuffing of the roller on the tobacco-stream surface, nor does tobacco build up at the roller. Rather, the motion of the tobacco along the conveyor 3 causes the roller 12 to rotate and closely follow undulations of the surface without being thrown upwardly if a conglomeration of tobacco is encountered. Thus the signal transmitted from the transducer 6 is accurately indicative of the amount of tobacco in the stream conveyed in the conveyor 3.

The signal from the transducer 6 is employed to vary the rate of operation of the hopper so that the percentage value of the returns is kept within preset limits. A smoothing circuit having a suitable time constant, ten seconds for example, ensures that no variation of the hopper discharge results from merely short term variation of the amount of tobacco in the conveyor 3.

The apparatus described above has proved effective for monitoring returns of cut cigarette tobacco and it would be suitable or adaptable for monitoring a stream of other loose and/or relatively light material, particularly such of a fibrous, filamentary or flocculent nature.

Depending upon the particulate material to be monitored, it is possible that an advantageous effect could be obtained with ribs of different number, form and dimensions. Indeed projections other than rib-form projections or other than projections extending at right angles to the direction of the stream of material could be used, for example such extending in a helical direction or directions.

What is claimed:

1. Apparatus, mounted in a cigarette-making machine comprising a tobacco-feed hopper, for monitoring the amount of tobacco returns material being conveyed in a stream thereof, on a returns conveyor, comprising a freely rotatory material-contacting means, means for mounting said contacting means so that it extends across the stream of material in contact with the surface thereof and is free to rise and fall in accordance with changes in the depth of the stream, and detection means operable to detect movement of said contacting means caused by such changes, which detection means is also operable to generate a signal indicative of the amount of tobacco being conveyed by said conveyor, said contacting means comprising projections extending transversely of the direction of the said stream, whereby the movement of the stream causes the contacting means to rotate and whereby said contacting means closely follows undulations of said surface, said feed hopper being responsive to said signal from said detection means to vary the feed rate of tobacco.

* * * * *